United States Patent
Ohashi et al.

(10) Patent No.: US 11,739,229 B2
(45) Date of Patent: Aug. 29, 2023

(54) TREATMENT LIQUID FOR SCREEN PRINTING PLATE AND METHOD FOR TREATING SCREEN PRINTING PLATE

(71) Applicant: RISO KAGAKU CORPORATION, Tokyo (JP)

(72) Inventors: Nami Ohashi, Ibaraki (JP); Yuki Imaichi, Ibaraki (JP); Hirotaka Tominaga, Ibaraki (JP); Hiroshi Hayashi, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 81 days.

(21) Appl. No.: 17/318,320

(22) Filed: May 12, 2021

(65) Prior Publication Data

US 2021/0371684 A1 Dec. 2, 2021

(30) Foreign Application Priority Data

May 27, 2020 (JP) ................................ 2020-092227
Jan. 25, 2021 (JP) ................................ 2021-009461

(51) Int. Cl.
| | | |
|---|---|---|
| *C09D 11/102* | (2014.01) | |
| *C09D 175/04* | (2006.01) | |
| *C09D 11/107* | (2014.01) | |
| *C09D 133/08* | (2006.01) | |
| *C09D 127/06* | (2006.01) | |
| *C09D 133/10* | (2006.01) | |

(52) U.S. Cl.
CPC .......... *C09D 11/102* (2013.01); *C09D 11/107* (2013.01); *C09D 127/06* (2013.01); *C09D 133/08* (2013.01); *C09D 133/10* (2013.01); *C09D 175/04* (2013.01)

(58) Field of Classification Search
CPC .. C09D 127/06; C09D 133/08; C09D 133/10; C09D 175/04
See application file for complete search history.

(56) References Cited

U.S. PATENT DOCUMENTS

| | | | | |
|---|---|---|---|---|
| 2016/0318299 | A1* | 11/2016 | Arai | ........................ C09D 11/10 |
| 2020/0276849 | A1* | 9/2020 | Urano | ................. D06P 1/67333 |
| 2020/0392360 | A1* | 12/2020 | Sato | ..................... C09D 11/106 |

FOREIGN PATENT DOCUMENTS

JP H7-89043 4/1995

OTHER PUBLICATIONS

Office Action issued for Chinese Patent Application No. 202110526325. 3, dated Feb. 7, 2022, 13 pages including machine translation.
Wenping Liang et al., "Application of Surfactant in Dispersion System," China Light Industry Press, 2017, 4 pages including partial translation; Discussed in the attached Chinese Office Action.

* cited by examiner

*Primary Examiner* — Wenwen Cai
(74) *Attorney, Agent, or Firm* — Hamre, Schumann, Mueller & Larson, P.C.

(57) ABSTRACT

A treatment liquid for a screen printing plate is disclosed that contains a resin, water, a surfactant A, and a surfactant B having a solubility in water lower than a solubility of the surfactant A in water. A method for treating a screen printing plate is also disclosed.

14 Claims, No Drawings

TREATMENT LIQUID FOR SCREEN PRINTING PLATE AND METHOD FOR TREATING SCREEN PRINTING PLATE

CROSS REFERENCE TO RELATED APPLICATIONS

This application is based upon and claims the benefit of priority from the prior Japanese Patent Application No. 2020-092227, filed on May 27, 2020, the entire contents of which are incorporated by reference herein, and the prior Japanese Patent Application No. 2021-009461, filed on Jan. 25, 2021, the entire contents of which are incorporated by reference herein.

BACKGROUND OF THE INVENTION

Field of the Invention

Embodiments of the present invention relate to a treatment liquid for a screen printing plate and a method for treating a screen printing plate.

Description of the Related Art

A screen printing plate used for stencil printing such as screen printing can be obtained by a method known as thermal platemaking in which a thermoplastic resin film of a heat-sensitive stencil master including the thermoplastic resin film and a porous support bonded together is perforated by performing selective heating and melting with a thermal head or the like, thereby forming perforations corresponding with an image. For example, a heat-sensitive screen master in which a screen printing mesh, or the like is used as the porous support may be used as the heat-sensitive stencil master.

For the thermoplastic resin film used for the heat-sensitive screen master, a very thin film having a thickness of about 1 to 5 µm is usually used in order to enable perforation by the thermal head. Since the film is thin, when a large number of printed items are printed, a minute hole (pinhole) may be generated in the film, and a minute dot may be printed in an unintended place of the printed matter.

JP H07-89043 A proposes a method for reinforcing a film by applying a resin solution to a screen printing plate which has been subjected to platemaking, leaving the resin solution only on an unperforated portion, and then drying to form a resin film.

SUMMARY OF THE INVENTIONS

An embodiment of the present invention relates to a treatment liquid for a screen printing plate, the treatment liquid containing a resin, water, a surfactant A, and a surfactant B having a solubility in water lower than a solubility of the surfactant A in water.

Another embodiment of the present invention relates to a method for treating a screen printing plate, the method including treating a screen printing plate with the treatment liquid for a screen printing plate according to the embodiment as described above.

DETAILED DESCRIPTION OF THE EMBODIMENTS

Embodiments of the present invention are described below in detail, but the present invention is of course not limited to these embodiments, and various modifications and alterations may be applied.

The treatment liquid for a screen printing plate (hereafter, sometimes referred to as "the treatment liquid") according to one embodiment contains a resin, water, a surfactant A, and a surfactant B having a solubility in water lower than the solubility of the surfactant A in water. This treatment liquid for a screen printing plate can be used as a reinforcing agent for a screen printing plate.

When the treatment liquid for a screen printing plate according to one embodiment is used, printing durability of the screen printing plate may be improved.

The screen printing plate typically has a layered structure including a screen printing mesh, an adhesive layer, and a film in this order. When, for the purpose of reinforcing the screen printing plate obtained by thermal platemaking, a reinforcing agent such as the resin-containing liquid described in JP H07-89043 A is applied to the screen printing mesh side of the screen printing plate, uneven application of the reinforcing agent may occur, which may result in generation of a portion to which the reinforcing agent is not applied. The portion to which the reinforcing agent is not applied is weaker in strength than the portion to which the reinforcing agent is applied, and, in a case where a large number of printed items are printed, minute holes (pinholes) may be easily generated in the portion to which the reinforcing agent is not applied.

Although it is not constrained by any particular theory, as one of the causes of the uneven application of the reinforcing agent, it is thought that since the cross section of the fibers of the screen printing mesh may be usually roughly circular, a gap may tend to be formed between the fibers at a portion where the fibers of the screen printing mesh come into contact with each other, and a portion not filled with the reinforcing agent or the like may be generated due to bubbles remaining in the gap. It is thought that when the treatment liquid according to one embodiment, which contains two surfactants having different solubilities in water, is used, the remaining bubbles may be moved to the surface of the layer of the applied treatment liquid by the surfactant A having a higher solubility in water, and the bubbles on the surface of the layer of the applied treatment liquid may be removed by the surfactant B having a solubility in water lower than that of the surfactant A, and therefore, the occurrence of uneven application may be reduced, and a relatively uniform layer of the applied treatment liquid may be formed. When the occurrence of uneven application of the treatment liquid can be reduced, the printing durability of the screen printing plate can be improved, and pinholes are less likely to be generated even when a large number of printed items are printed.

The treatment liquid may contain a resin. As the resin, for example, a water-dispersible resin, a water-soluble resin or a combination thereof can be used.

Since the water-dispersible resin exhibits water dispersibility, the water-dispersible resin can be dispersed in water in particulate form without dissolving, forming an oil-in-water (O/W) resin emulsion. The water-dispersible resin is preferably contained in the treatment liquid in a dispersed state as resin particles.

The water-dispersible resin may be any of an anionic resin, a cationic resin, an amphoteric resin and a nonionic resin.

The water-dispersible resin may be a resin in which functional groups of the resin exist at the surface of the resin particles, such as a self-emulsifying resin. The water-dispersible resin may be a resin that has been subjected to a surface treatment such as adhering a dispersant to the surface of the resin particles.

Examples of the water-dispersible resins include urethane-based resins, (meth)acrylic-based resins, vinyl chloride-based resins, styrene-maleic anhydride copolymer resins, and vinyl acetate-ethylene copolymer resins. The water-dispersible resin is not particularly limited, but, for example, one of these resins may be used alone, or a combination of two or more of these resins may be used.

The water-dispersible resin is preferably a water-dispersible urethane-based resin, a water-dispersible (meth)acrylic-based resin, a water-dispersible vinyl chloride-based resin or a combination thereof.

Examples of the water-dispersible urethane-based resins include water-dispersible polyether-type urethane-based resins, water-dispersible polyester-type urethane-based resins, and water-dispersible polycarbonate-type urethane-based resins.

As the water-dispersible urethane-based resin, a reaction product of a polyisocyanate and a polyol can be used.

The (meth)acrylic-based resin refers to a polymer containing at least a methacrylic unit, an acrylic unit, or combinations thereof.

The water-dispersible (meth)acrylic-based resin is preferably a polymer containing a unit derived from a (meth)acrylic-based monomer. The water-dispersible (meth)acrylic-based resin may contain a unit derived from another monomer, in addition to the unit derived from a (meth)acrylic-based monomer.

Examples of the (meth)acrylic-based monomers include acrylic acid, methacrylic acid, acrylate, methacrylate, acrylamide, methacrylamide, acrylonitrile, methacrylonitrile, and derivatives thereof one of these (meth)acrylic-based monomers may be used alone or a combination of two or more of these (meth)acrylic-based monomers may be used.

Examples of other units that may be used in the (meth)acrylic-based resin include a styrene unit, a vinyl acetate unit, a vinyl chloride unit, and an epoxy unit. One kind of these units may be used alone or a combination of two or more kinds of these units may be used.

Examples of the water-dispersible (meth)acrylic-based resins include (meth)acrylic polymers, styrene-(meth)acrylic copolymers, vinyl acetate-(meth)acrylic copolymers, vinyl chloride-(meth)acrylic copolymers, epoxy ester resins, and combinations thereof. The water-dispersible (meth)acrylic-based resin is preferably a (meth)acrylic polymer, a styrene-(meth)acrylic copolymer or a combination thereof.

The water-dispersible vinyl chloride-based resin is preferably a polymer containing a vinyl chloride unit. The water-dispersible vinyl chloride-based resin may contain another unit derived from another monomer, in addition to the vinyl chloride unit.

Examples of other units that may be used in the water-dispersible vinyl chloride-based resin include an ethylene unit, a styrene unit, and a unit derived from a (meth)acrylic-based monomer. One kind of these units may be used alone or a combination of two or more kinds of these units may be used.

Examples of the water-dispersible vinyl chloride-based resins include vinyl chloride polymers, ethylene-vinyl chloride copolymers, vinyl chloride-(meth)acrylic copolymers, and combinations thereof.

There are no particular limitations on the weight average molecular weight (Mw) of the water-dispersible resin. The weight average molecular weight (Mw) of the water-dispersible resin is preferably from 1,000 to 100,000. Here, the resin weight average molecular weight refers to a value determined as a polystyrene-equivalent weight average molecular weight by the gel permeation (GPC) method. The same applies hereafter unless otherwise specified.

The water-dispersible resin can be added in the treatment liquid in the form of an oil-in-water (O/W) resin emulsion which forms particles in the treatment liquid, and is preferably in the form of resin particles in the treatment liquid.

Examples of commercially available water-dispersible urethane-based resin emulsions include "SUPERFLEX 420" (a product name) manufactured by DKS Co., Ltd., and "HYDRAN APX 101H" (a product name) manufactured by DIC Corporation.

Examples of commercially available water-dispersible (meth)acrylic-based resin emulsions include "VONCOAT DV-961" (a product name) manufactured by DIC Corporation.

Examples of commercially available water-dispersible vinyl chloride-based resin emulsions include "VINYBLAN 715S" (a product name) manufactured by Nissin Chemical Industry Co., Ltd.

Examples of water-soluble resins include polyester-based resins, polyvinyl alcohols, polyacrylic acids, neutralized polyacrylic acids, acrylic acid/maleic acid copolymers, acrylic acid/sulfonic acid copolymers, and styrene/maleic acid copolymers. One of these resins may be used alone or a combination of two or more of these resins may be used.

The minimum film-forming temperature (MFT) of the resin is preferably 23° C. or lower from the viewpoint of improving applicability of the treatment liquid to the screen printing plate. The MFT value describes a temperature required for the resin to undergo filming (film formation), and can be measured in accordance with JIS K 6828-2.

The MFT of the resin is more preferably 20° C. or lower.

The MFT of the resin is preferably 0° C. or higher, and more preferably PC or higher.

The MFT of the resin is, for example, preferably from 0° C. to 23° C., and more preferably from 1° C. to 20° C.

The treatment liquid may contain only one resin or a combination of two or more resins.

There are no particular limitations on the weight average molecular weight (Mw) of the resin, but the weight average molecular weight (Mw) of the resin is preferably from 1,000 to 100,000.

There are no particular limitations on the amount of the resin in the treatment liquid.

From the viewpoint of reinforcing the screen printing plate, the amount of the resin, expressed as a solid fraction amount relative to the total mass of the treatment liquid, is preferably 1% by mass or greater, more preferably 10% by mass or greater, and still more preferably 20% by mass or greater. On the other hand, the amount of the resin, expressed as a solid fraction amount relative to the total mass of the treatment liquid, is preferably 50% by mass or less, more preferably 45% by mass or less, and still more preferably 40% by mass or less. For example, the amount of the resin, expressed as a solid fraction amount relative to the total mass of the treatment liquid, is preferably from 1 to 50% by mass, more preferably from 10 to 45% by mass, and still more preferably from 20 to 40% by mass.

The treatment liquid may contain at least one selected from the group consisting of a polyether-modified silicone-based compound and a (meth)acrylic-modified silicone-based compound (hereafter sometimes referred to as "the silicone-based compound S") as described below, and as such a compound, a resin such as a (meth)acrylic-modified silicone-based resin may be contained in the treatment liquid. The total amount of the resins including such a resin may be, for example, within the above range.

The treatment liquid may contain two surfactants having different solubilities in water.

The treatment liquid may contain a surfactant A, and a surfactant B having a solubility in water lower than the solubility of the surfactant A in water, as the two surfactants having different solubilities in water.

The solubility of the surfactant A in water is preferably greater than the solubility of the surfactant B in water. The solubility of the surfactant A in water at 23° C. is preferably greater than the solubility of the surfactant B at 23° C. in water. From the viewpoint of improving the applicability of the treatment liquid to the screen printing plate, the solubility of the surfactant A in water at 23° C. is preferably 1 g/100 g or greater, more preferably 2 g/100 g or greater, and still more preferably 5 g/100 g or greater. From the viewpoint of improving the applicability of the treatment liquid to the screen printing plate, the solubility of the surfactant A in water at 23° C. is preferably 20 g/100 g or less, more preferably 15 g/100 g or less, and still more preferably 10 g/100 g or less.

The solubility of the surfactant A in water at 23° C. is, for example, preferably from 1 g/100 g to 20 g/100 g, more preferably from 2 g/100 g to 15 g/100 g, and still more preferably from 5 g/100 g to 10 g/100 g.

The solubility of the surfactant B in water is preferably lower than the solubility of the surfactant A in water. The solubility of the surfactant B in water at 23° C. is preferably lower than the solubility of the surfactant A in water at 23° C.

The solubility of the surfactant B in water at 23° C. is preferably less than 1 g/100 g, more preferably 0.5 g/100 g or less, and still more preferably 0.1 g/100 g or less. The solubility of the surfactant B in water at 23° C. is preferably 0.01 g/100 g or greater.

The solubility of the surfactant B in water at 23° C. is, for example, preferably from 0.01 g/100 g to less than 1 g/100 g, more preferably from 0.01 g/100 g to 0.5 g/100 g, and still more preferably from 0.01 g/100 g to 0.1 g/100 g.

From the viewpoint of improving the applicability of the treatment liquid to the screen printing plate, it is preferable that the solubility of the surfactant A in water at 23° C. is 1 g/100 g or greater, and the solubility of the surfactant B in water at 23° C. is lower than 1 g/100 g. It is more preferable that the solubility of the surfactant A in water at 23° C. is 2 g/100 g or greater, and the solubility of the surfactant B in water at 23° C. is less than 1 g/100 g. It is even more preferable that the solubility of the surfactant A in water at 23° C. is 2 g/100 g or greater, and the solubility of the surfactant B in water at 23° C. is 0.5 g/100 g or less.

There are no particular limitation on the HLB value of the surfactant A, but the HLB value of the surfactant A is preferably 5 to 20. Similarly, there are no particular limitation on the HLB value of the surfactant B, but the HLB value of the surfactant B is preferably 5 to 20.

Surfactants A and B may each independently be an ionic surfactant or a nonionic surfactant. For example, the surfactant A and the surfactant B may each independently be an ionic surfactant. The surfactant A and the surfactant B may each independently be a nonionic surfactant. In a case in which a water-dispersible resin is used as the resin in the treatment liquid, it is preferable that the surfactant A and the surfactant B are each independently a nonionic surfactant.

Examples of nonionic surfactants include acetylene glycol-based surfactants, polyoxyethylene alkyl ether-based surfactants, polyoxypropylene alkyl ether-based surfactants, polyoxyethylene alkyl phenyl ether-based surfactants, polyoxypropylene alkyl phenyl ether-based surfactants, polyoxyethylene fatty acid ester-based surfactants, polyoxypropylene fatty acid ester-based surfactants, sorbitan fatty acid ester-based surfactants, polyoxyethylene sorbitan fatty acid ester-based surfactants, polyoxyethylene sorbitol fatty acid ester-based surfactants, and glycerol fatty acid ester-based surfactants. The surfactant A and/or the surfactant B may be each independently selected from these surfactants.

Among the nonionic surfactants, the acetylene glycol-based surfactant is preferable.

The acetylene glycol-based surfactant is a glycol having an acetylene group, and is preferably a glycol having a symmetrical structure in which the acetylene group is positioned at the center. The acetylene glycol-based surfactant may have a structure in which ethylene oxide is added to acetylene glycol.

From the viewpoint of improving the applicability of the treatment liquid to the screen printing plate, at least one of the surfactant A and the surfactant B is preferably an acetylene glycol-based surfactant. It is more preferable that at least the surfactant A is an acetylene glycol-based surfactant.

From the viewpoint of improving the applicability of the treatment liquid to the screen printing plate, it is preferable that the solubility of the surfactant A in water at 23° C. is 1 g/100 g or greater, the solubility of the surfactant B in water at 23° C. is less than 1 g/100 g, and the surfactant A is an acetylene glycol-based surfactant.

Examples of acetylene glycol-based surfactants include 2,4,7,9-tetramethyl-5-decine-4,7-diol.

Examples of commercially available products of acetylene glycol-based surfactants include "OLFINE E1030W", "OLFINE E1020", "SURFYNOL DF37" and "SURFYNOL AD01" (all product names) available from Nissin Chemical Industry Co., Ltd.

Examples of commercially available products of polyoxyethylene alkyl ether-based surfactants include "NIKKOL BT-7" and "NIKKOL BT-9" (all product names) manufactured by Nikko Chemicals Co., Ltd.

The amount of the surfactant A, relative to the total mass of the treatment liquid, is preferably 0.1% by mass or greater, and more preferably 0.5% by mass or greater. On the other hand, the amount of the surfactant A, relative to the total mass of the treatment liquid, is preferably 10% by mass or less, more preferably 5% by mass or less, and still more preferably 2% by mass or less. For example, the amount of the surfactant A, relative to the total mass of the treatment liquid, is preferably from 0.1 to 10% by mass, more preferably from 0.5 to 5% by mass, and still more preferably from 0.5 to 2% by mass.

The amount of the surfactant B, relative to the total mass of the treatment liquid, is preferably 0.1% by mass or greater, and more preferably 0.2% by mass or greater. On the other hand, the amount of the surfactant B, relative to the total mass of the treatment liquid, is preferably 5% by mass or less, and more preferably 1% by mass or less. For example, the amount of the surfactant B, relative to the total mass of the treatment liquid, is preferably from 0.1 to 5% by mass, and more preferably from 0.2 to 1% by mass. From the viewpoint of defoaming effect, the amount of the surfactant B added to the treatment liquid is preferably an amount equal to or greater than the amount of solubility in water.

The total amount of the surfactant A and the surfactant B, relative to the total mass of the treatment liquid, is preferably 0.1% by mass or greater, and more preferably 0.5% by mass or greater. On the other hand, the total amount of the surfactant A and the surfactant B, relative to the total mass of the treatment liquid, is preferably 10% by mass or less, more preferably 5% by mass or less, and still more preferably 2% by mass or less. For example, the total amount of the surfactant A and the surfactant B, relative to the total mass of the treatment liquid, is preferably from 0.1 to 10% by mass, more preferably from 0.5 to 5% by mass, and still more preferably from 0.5 to 2% by mass.

The amount of the surfactant B, relative to the total mass of the surfactant A and the surfactant B, is preferably 1% by mass or greater, more preferably 5% by mass or greater, and still more preferably 10% by mass or greater. On the other hand, the amount of the surfactant B, relative to the total mass of the surfactant A and the surfactant B, is preferably 50% by mass or less, more preferably 40% by mass or less, and still more preferably 30% by mass or less. For example, the amount of the surfactant B, relative to the total mass of the surfactant A and the surfactant B, is preferably from 1 to 50% by mass, more preferably from 5 to 40% by mass, and still more preferably from 10 to 30% by mass.

The surfactant contained in the treatment liquid may contain only the surfactant A and the surfactant B, which are two surfactants having different solubilities in water. The surfactant contained in the treatment liquid may further contain one or more surfactants in addition to these two surfactants. The one or more surfactants other than the two surfactants having different solubilities in water are not particularly limited as long as each of them is different from each of the two surfactants having different solubilities in water, and their solubilities in water are not particularly limited.

The treatment liquid may contain the silicone-based compound S described below, and, as such a compound, a surfactant such as a polyether-modified silicone-based surfactant may be contained in the treatment liquid. For example, the treatment liquid may contain the surfactant A and the surfactant B, and may further contain a surfactant such as a polyether-modified silicone-based surfactant.

The total amount of the surfactant contained in the treatment liquid, relative to the total mass of the treatment liquid, is preferably 0.1% by mass or greater, and more preferably 1% by mass or greater. On the other hand, the total amount of the surfactant contained in the treatment liquid, relative to the total mass of the treatment liquid, is preferably 10% by mass or less, and more preferably 5% by mass or less. For example, the total amount of the surfactant contained in the treatment liquid, relative to the total mass of the treatment liquid, is preferably from 0.1 to 10% by mass, and more preferably from 1 to 5% by mass.

The treatment liquid preferably contains water. In those cases in which a material containing water as a solvent, such as the above-mentioned resin emulsion, is used in the preparation of the treatment liquid, the water contained in such material is calculated into a part of the water in the treatment liquid, for the preparation of the treatment liquid.

There are no particular limitation on the water, but water is preferably the one in which the amount of ionic components contained therein is as low as possible. In particular, from the viewpoint of the storage stability of the treatment liquid, the amount of polyvalent metal ions such as calcium ions contained in the water is preferably small. Examples of water that may be used include ion-exchanged water, distilled water, and ultrapure water.

The amount of water contained in the treatment liquid, relative to the total mass of the treatment liquid, is preferably from 50% by mass to 95% by mass, and more preferably from 60% by mass to 90% by mass.

The treatment liquid may contain a water-soluble organic solvent. The water-soluble organic solvent is preferably compatible with water. Organic compounds that are liquid at room temperature and soluble in or miscible with water may be used as the water-soluble organic solvent, and the use of a water-soluble organic solvent that may mix uniformly with an equal volume of water at one atmosphere and 20° C. is preferred.

Examples of water-soluble organic solvents that may be used include lower alcohols such as methanol, ethanol, 1-propanol, isopropanol, 1-butanol, 2-butanol, isobutanol and 2-methyl-2-propanol; glycols such as ethylene glycol, diethylene glycol, triethylene glycol, tetraethylene glycol, pentaethylene glycol, propylene glycol, dipropylene glycol, tripropylene glycol, and 1,3-propanediol; glycerols such as glycerol, diglycerol, triglycerol, and polyglycerol; acetins such as monoacetin and diacetin; glycol ethers such as ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monopropyl ether, diethylene glycol monobutyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, tetraethylene glycol dimethyl ether, and tetraethylene glycol diethyl ether; triethanolamine, 1-methyl-2-pyrrolidone, 1,3-dimethyl-2-imidazolidinone, β-thiodiglycol, and sulfolane.

One of these solvents may be used alone, or a combination of two or more of these solvents may be used, provided the solvents form a single phase.

From the viewpoint of further improving the strength of the film of the screen printing plate and further improving the printing durability, the treatment liquid preferably contains silica.

There are no particular limitations on silica. Examples of silica include powder silica, colloidal silica, and synthetic amorphous silica. One of these may be used alone or a combination of two or more of these may be used.

The average particle size of the silica is preferably from 10 to 400 nm, more preferably from 15 to 300 nm, and still more preferably from 25 to 200 nm. The average particle size of the silica represents the volume-based average particle size determined by a dynamic light scattering method, and can be measured, for example, using a dynamic light scattering particle size distribution analyzer LB-500 manufactured by Horiba, Ltd.

Examples of commercially available products of silica include "SNOWTEX 30" (a product name) manufactured by Nissan Chemical Corporation.

The amount of silica in the treatment liquid, expressed as a solid fraction amount relative to the total mass of the treatment liquid, is preferably 0.01% by mass or greater, and more preferably 0.05% by mass or greater. On the other hand, the amount of silica in the treatment liquid, expressed as a solid fraction amount relative to the total mass of the treatment liquid, is preferably 1% by mass or less, and more preferably 0.5% by mass or less. For example, the amount of silica contained in the treatment liquid, expressed as a solid fraction amount relative to the total mass of the treatment liquid, is preferably from 0.01 to 1% by mass, and more preferably from 0.05 to 0.5% by mass.

From the viewpoint of improving the printing durability, the treatment liquid preferably contains at least one selected from the group consisting of a polyether-modified silicone-based compound and a (meth)acrylic-modified silicone-based compound (hereafter, sometimes referred to as "the silicone-based compound S"). Although it is not constrained by any particular theory, it is thought that when the silicone-based compound S is contained in the treatment liquid, the surface tension of the treatment liquid tends to be lowered, and therefore, the treatment liquid may easily enter under the screen printing mesh, and the movement of the remaining bubbles to the surface of the layer of the applied treatment liquid may be promoted, and thus the printing durability can be further improved.

Examples of the polyether-modified silicone-based compounds include polyether-modified silicone-based surfactants.

The polyether-modified silicone-based surfactant preferably has a structure in which a polyether group is introduced into, for example, a terminal and/or a side chain of, a silicone oil. Examples of polyether groups include polyalkyleneoxy groups such as a polyethyleneoxy group and a polypropyleneoxy group, and polyalkyleneoxy groups in which two or more kinds of alkyleneoxy groups (for example, two or more kinds of alkyleneoxy groups including an ethyleneoxy group and a propyleneoxy group) are added in block form or at random.

Examples of commercially available products of polyether-modified silicone-based surfactants include "SILFACE SAG002", "SILFACE SAG005", "SILFACE SAG 503A", and "SILFACE SAG008" (all product names) manufactured by Nissin Chemical Industry Co., Ltd. One of these products may be used alone or a combination of two or more of these products may be used.

In the treatment liquid, one of these polyether-modified silicone-based surfactants may be used alone or a combination of two or more of these polyether-modified silicone-based surfactant may be used.

The amount of the polyether-modified silicone-based compound, relative to the total mass of the treatment liquid, is preferably 0.1% by mass or greater, and more preferably 0.5% by mass or greater. On the other hand, the amount of the polyether-modified silicone-based compound, relative to the total mass of the treatment liquid, is preferably 10% by mass or less, more preferably 5% by mass or less, and still more preferably 2% by mass or less. For example, the amount of the polyether-modified silicone-based compound, relative to the total mass of the treatment liquid, is preferably from 0.1 to 10% by mass, more preferably from 0.5 to 5% by mass, and still more preferably 0.5 to 2% by mass.

As the (meth)acrylic-modified silicone-based compound, a silicone-based compound containing a structure derived from a (meth)acrylic-based compound can be used. Examples of the (meth)acrylic-based compounds include acrylic acid, methacrylic acid, acrylate, methacrylate, acrylamide, methacrylamide, acrylonitrile, methacrylonitrile, and derivatives thereof.

Examples of the (meth)acrylic-modified silicone-based compounds include (meth)acrylic-modified silicone-based resins. Examples of the (meth)acrylic-modified silicone-based resins include copolymers containing a structure derived from a (meth)acrylic-based monomer and a structure derived from a silicone-based compound such as dimethylpolysiloxane. The (meth)acrylic-modified silicone-based resin may be, for example, a copolymer of a (meth)acrylic-based monomer, a silicone-based compound such as dimethylpolysiloxane, and if necessary, one or more other optional monomers. Examples of the (meth)acrylic-based monomers include those given as examples of the (meth)acrylic-based compounds described above. As the (meth)acrylic-modified silicone-based resin, a water-dispersible resin, a water-soluble resin or a combination thereof can be used.

There are no particular limitations on the weight average molecular weight (Mw) of the (meth)acrylic-modified silicone-based resin, but the weight average molecular weight (Mw) of the (meth)acrylic-modified silicone-based resin is preferably from 1,000 to 100,000.

Examples of commercially available products of the (meth)acrylic-modified silicone-based resins include "KP-578" (a product name) manufactured by Shin-Etsu Chemical Co., Ltd. Examples of commercially available water-dispersible (meth)acrylic-modified silicone-based resin emulsions include "CHALINE E-370" (a product name) manufactured by Nissin Chemical Industry Co., Ltd.

The amount of the (meth)acrylic-modified silicone-based compound, relative to the total mass of the treatment liquid, is preferably 0.1% by mass or greater, and more preferably 0.5% by mass or greater. On the other hand, the amount of the (meth)acrylic-modified silicone-based compound, relative to the total mass of the treatment liquid, is preferably 10% by mass or less, more preferably 5% by mass or less, and still more preferably 2% by mass or less. For example, the amount of the (meth)acrylic-modified silicone-based compound, relative to the total mass of the treatment liquid, is preferably from 0.1 to 10% by mass, more preferably from 0.5 to 5% by mass, and still more preferably from 0.5 to 2% by mass.

The amount of the silicone-based compound S, relative to the total mass of the treatment liquid, is preferably 0.1% by mass or greater, and more preferably 0.5% by mass or greater. On the other hand, the amount of the silicone-based compound S, relative to the total mass of the treatment liquid, is preferably 10% by mass or less, more preferably 5% by mass or less, and still more preferably 2% by mass or less. For example, the amount of the silicone-based compound S, relative to the total mass of the treatment liquid, is preferably from 0.1 to 10% by mass, more preferably from 0.5 to 5% by mass, and still more preferably from 0.5 to 2% by mass.

The treatment liquid may further contain one or more additives and the like, if necessary. Examples of the additives include pigments, antifreezing agents, and antistatic agents.

There are no particular limitations on the method for producing the treatment liquid. The treatment liquid may be produced by, for example, mixing the materials, either in a single batch or in a number of separate batches.

The treatment liquid can be preferably used for a screen printing plate obtained by thermal platemaking.

There are no particular limitations on the screen printing plate. The screen printing plate may be, for example, a plate obtained by subjecting a heat-sensitive screen master to thermal platemaking.

The heat-sensitive screen master preferably includes a screen printing mesh and a thermoplastic resin film.

The heat-sensitive screen master may preferably be a heat-sensitive screen master in which a screen printing mesh and a thermoplastic resin film are bonded together using an adhesive. The heat-sensitive screen master preferably includes, for example, a screen printing mesh, an adhesive layer formed using an adhesive, and a thermoplastic resin film in this order.

The screen printing mesh may be any screen printing mesh that undergoes substantially no perforation upon heating with a thermal head and enables ink to pass through the screen printing mesh during printing, and for example, a screen printing mesh produced from fibers of, for example, polyester, nylon, rayon, stainless steel, silk, cotton or the like may be used.

The thickness of the screen printing mesh is typically from 40 to 270 µm, and is preferably from 50 to 150 µm.

The mesh count (the number of fibers per one inch) of the screen printing mesh is typically from 40 to 500, and is preferably from 50 to 350. The mesh count in the longitudinal direction and the mesh count in the transverse direction may be the same or different, provided they each fall within the above mesh count range.

As the mesh count of the screen printing mesh increases, when the reinforcing agent is applied to the screen printing mesh side of the screen printing plate, the air in the opening of the screen printing mesh is less likely to be replaced with the reinforcing agent, and the uneven application is more likely to occur.

In those cases where the treatment liquid of an embodiment is used, the influence of air in the opening of the screen printing mesh may be lowered and the uneven application may be reduced, even when a screen printing mesh of a high mesh count is used.

Examples thermoplastic resin film that may be used include polyethylene-based resin films, polypropylene-based resin films, polyester-based resin films, polyamide-based resin films, polyvinyl chloride-based resin films, and polyvinylidene chloride-based resin films. Among these, polyester-based resin films may be preferably used. Specific examples of the polyester-based resins include polyethylene terephthalate, polyethylene-2,6-naphthalate, polybutylene terephthalate, ethylene terephthalate/ethylene isophthalate copolymers, butylene terephthalate/ethylene terephthalate copolymers, butylene terephthalate/hexamethylene terephthalate copolymers, hexamethylene terephthalate/1,4-cyclohexane dimethylene terephthalate copolymers, and ethylene terephthalate/ethylene-2,6-naphthalate copolymers. The thermoplastic resin film may further contain one or more additives if necessary, and examples of such additives include pigments, viscosity adjusters, dispersants, dyes, lubricants, crosslinking agents, and plasticizers.

The thickness of the thermoplastic resin film may be any thickness that enables heat-sensitive digital screen platemaking, but is typically within a range from 0.5 to 10 µm, and is preferably from 1 to 5 µm.

The thermoplastic resin film preferably exhibits shrinkage properties that are suitable for facilitating melt perforation by thermal digital screen platemaking, and may be a uniaxially or biaxially stretched film as appropriate.

The heat-sensitive screen master can be produced, for example, by a method that includes bonding the screen printing mesh and the thermoplastic resin film using an adhesive.

There are no particular limitation on the adhesive, as long as the screen printing mesh and the thermoplastic resin can be bonded together in such a manner that the printing durability required for printing can be satisfied. Examples of the adhesives include aqueous type adhesives, solvent type adhesives, solvent-free type adhesives, hot melt type adhesives, photocurable type adhesives such as infrared ray-curable type adhesives, visible ray-curable type adhesives, ultraviolet ray-curable type adhesives, and electron beam-curable type adhesives.

Specific examples of solvent-type adhesives include those containing a resin, such as a vinyl acetate-based resin, a polyester-based resin, or a (meth)acrylic-based resin, dissolved in an organic solvent. Examples of the organic solvents include aliphatic hydrocarbon-based organic solvents, aromatic hydrocarbon-based organic solvents, alcohol-based organic solvents, ketone-based organic solvents, ester-based organic solvents, ether-based organic solvents, aldehyde-based organic solvent, carboxylic acid-based organic solvents, amine-based organic solvents, low molecular weight heterocyclic compound-based organic solvents, and oxide-based organic solvents. Specific examples of the organic solvents include hexane, heptane, octane, benzene, toluene, xylene, methyl alcohol, ethyl alcohol, isopropyl alcohol, n-propyl alcohol, butyl alcohol, ethylene glycol, diethylene glycol, propylene glycol, glycerol, acetone, methyl ethyl ketone, ethyl acetate, propyl acetate, ethyl ether, tetrahydrofuran, 1,4-dioxane, formic acid, acetic acid, propionic acid, formaldehyde, acetaldehyde, methylamine, ethylenediamine, dimethylformamide, pyridine, and ethylene oxide. Examples of the photo-curable-type adhesives include those containing, as main components, a monomer, an oligomer, and/or a photopolymerization initiator. Specific examples of the photo-curable-type adhesives include polyester-based (meth)acrylate-based photo-curable adhesives, urethane-based (meth)acrylate-based photo-curable adhesives, epoxy-based (meth)acrylate-based photo-curable adhesives, and polyol-based (meth)acrylate-based photo-curable adhesives. These adhesives may contain one or more additives. Examples of such additives include antistatic agents, lubricants, tackifiers, fillers, and leveling agents.

There are no particular limitations on the method used for bonding the screen printing mesh and the thermoplastic resin film using the adhesive. For example, the adhesive may be applied using a roll coater or the like, and the screen printing mesh and the thermoplastic resin film may be bonded together.

There are no particular limitations on the method used for applying the adhesive. The adhesive may be applied to the screen printing mesh using, for example, a roll coater or the like, or may be applied to the screen printing mesh, for example, by dipping the screen printing mesh in the adhesive diluted with a solvent.

The amount applied of the adhesive is typically within a range of from 0.05 to 10.0 $g/m^2$. From the viewpoint of the adhesive strength, the amount applied of the adhesive is preferably 0.05 $g/m^2$ or greater. From the viewpoint of the ink passability and achieving favorable perforation, the amount applied of the adhesive is preferably 10.0 $g/m^2$ or less.

A releasing layer may be provided on the outer surface side (that is, the side opposite to the side at which the screen printing mesh is located) of the thermoplastic resin film of the heat-sensitive screen master by applying a release agent, for the purpose of prevention of the sticking at the time of perforation. Although there no particular limitations on the method used for applying the release agent, it is preferable to apply the release agent using a roll coater, a gravure coater, a reverse coater, a bar coater or the like. Examples of the compounds that may be used for the releasing agent include silicone oils, silicone-based resins, fluorine-based resins, and surfactants. One or more additives can be mixed with the releasing agent, and examples of the additives include antistatic agents, heat resistant agents, antioxidants, organic particles, inorganic particles, and pigments. Further, the coating liquid for the release agent may contain one or more additives for the purpose of improving dispersibility in water, and examples of such additives include dispersion auxiliary agents, surfactants, preservatives and defoaming agents. The thickness of the releasing layer is preferably from 0.005 µm to 0.4 µm, more preferably from 0.01 µm to 0.4 µm, from the viewpoints of the runnability at the time of perforation and the stain resistance of the thermal head (TPH).

When a heat-sensitive screen master to which a release agent has been applied is stored in a rolled state before platemaking, the release agent on the outer surface of the thermoplastic resin film may adhere to the surface of the screen printing mesh that is in contact with the outer surface of the thermoplastic resin film. If the release agent is adhered to the surface of the screen printing mesh, then, at the time of applying the reinforcing agent or the like to the screen printing mesh side of the screen printing plate, the applied reinforcing agent or the like may tend to be repelled, and uneven application of the reinforcing agent or the like may tend to occur. In those cases where the treatment liquid of one embodiment is used, the influence of the release agent may be reduced and the application unevenness may be reduced, even when the release agent adheres to the screen printing mesh of the screen printing plate.

There no particular limitations on the method used for subjecting the heat-sensitive screen master to thermal platemaking. The heat-sensitive screen master can undergo platemaking using a thermal platemaking device that uses a thermal head, and the obtained plate can be used as a screen printing plate.

The method for treating a screen printing plate of one embodiment is a method including treating a screen printing plate with the above described treatment liquid.

The treatment liquid and the screen printing plate are as described above.

When this method for treating a screen printing plate is used, the printing durability of the screen printing plate can be improved.

There are no particular limitations on the method used for treating the screen printing plate with the treatment liquid.

The treatment liquid is preferably applied to the surface of the screen printing mesh side of the screen printing plate.

Although there are no particular limitations on the method used for applying the treatment liquid, it is preferable to drop the treatment liquid onto the surface of the screen printing plate using, for example, a syringe or a dispenser, and then to spread the dropped liquid through the portion to which the treatment liquid is to be applied by squeegee or the like.

The amount applied of the treatment liquid, as the total amount of the treatment liquid, is preferably 10 $g/m^2$ or greater, and more preferably 20 $g/m^2$ or greater. The amount applied of the treatment liquid, as the total amount of the treatment liquid, is preferably 100 $g/m^2$ or less. For example, the amount applied of the treatment liquid, as the total amount of the treatment liquid, is preferably from 10 to 100 $g/m^2$, and more preferably from 20 to 100 $g/m^2$.

From the viewpoint of removing the solvent from the treatment liquid and securing the strength of the reinforcing layer formed from the treatment liquid, it is preferable to dry the treatment liquid on the screen printing plate after applying the treatment liquid to the screen printing plate. There are no particular limitations on the method used for drying, and examples of the methods used for drying include drying by hot air, and natural drying. The method used for drying can be appropriately selected. From the viewpoint of reinforcing the reinforcing layer, drying by hot air is preferable.

The method for treating a screen printing plate may further includes one or more other steps or operations.

Using the screen printing plate that has been treated with the treatment liquid for a screen printing plate of one embodiment, stencil printing can be performed. Examples of inks that may be used for the printing include inks which can be used for stencil printing such as screen printing. Examples of such inks include oil-based inks, solvent inks, aqueous inks, water-in-oil (W/O) emulsion inks, oil-in-water (O/W) emulsion inks, and plastisol inks.

EXAMPLES

The present invention is described below in further detail based on a series of examples and comparative examples, but the present invention is not limited solely to these examples. Unless specifically stated otherwise, "%" refers to "% by mass", with the exception of the "application ratio" (%) used in the evaluation of the applicability. Blend amounts for the various components in the tables also represent "% by mass" values.

<Production of Treatment Liquid>

The compositions of treatment liquids of various examples and comparative examples are shown in Table 1 to 3. The blend amount of each resin emulsion among the "resins" and the "silicone-based compounds S" in the tables represents the total amount of the resin emulsion. The blend amount of the "colloidal silica" ("SNOWTEX 30" ($SiO_2$ 30%)) represents the total amount of the dispersion. The blend amount of the "silicone 1" represents the total amount of the components including components other than the active component. The solvent contained in the resin emulsions among the resins and the silicone-based compounds S, and the solvent contained in the colloidal silica in the table are mainly water. In Tables 1 and 2, "Ex." indicates "Examples".

The materials shown in the tables were mixed to obtain the treatment liquids of various examples and comparative examples.

Details of each of the materials listed in Tables 1 to 3 are shown below.

(Resins)

Urethane-based resin emulsion 1: "SUPERFLEX 420" (an emulsion of a water-dispersible urethane-based resin, solid fraction content: 32%) (MFT 20° C.) manufactured by DKS Co., Ltd.

Urethane-based resin emulsion 2: "HYDRAN APX 101H" (an emulsion of a water-dispersible urethane-based resin, solid fraction content: 45%) (MFT 18° C.) manufactured by DIC Corporation (Meth)acrylic-based resin emulsion: "VONCOAT DV-961" (an emulsion of a water-dispersible (meth)acrylic-based resin, solid fraction content: 40%) (MFT 15° C.) manufactured by DIC Corporation Vinyl chloride-based resin emulsion: "VINYBLAN 715S" (an emulsion of a water-dispersible vinyl chloride-based resin, solid fraction content: 24%) (MFT 5° C.) manufactured by Nissin Chemical Industry Co., Ltd.

(Surfactants)

Acetylene glycol-based surfactant 1: "OLFINE E1020" (active ingredient content: 100%, solubility in water: 10 g/100 g, at 23° C.) manufactured by Nissin Chemical Industry Co., Ltd.

Acetylene glycol-based surfactant 2: "SURFYNOL DF37" (active ingredient content: 100%, solubility in water: 0.05 g/100 g, at 23° C.) manufactured by Nissin Chemical Industry Co., Ltd.

Acetylene glycol based surfactant 3: "SURFYNOL AD01" (active ingredient content: 100%, solubility in water: 0.06 g/100 g, at 23° C.) manufactured by Nissin Chemical Industry Co., Ltd.

Polyoxyethylene alkyl ether-based surfactant 1. "NIKKOL BT-7" (active ingredient content: 100%, solubility in water: 10 g/100 g, at 23° C.) manufactured by Nikko Chemicals Co., Ltd.

Polyoxyethylene alkyl ether-based surfactant 2: "NIK-KOL BT-9" (active ingredient 100%, solubility in water: 10 g/100 g, at 23° C.) manufactured by Nikko Chemicals Co., Ltd.

(Silica)

Colloidal silica: "SNOWTEX 30" ($SiO_2$ 30%) manufactured by Nissan Chemical Corporation.

(Silicone-Based Compounds S)

Silicone 1: "CHALINE E-370" (an emulsion of a water-dispersible (meth)acrylic-modified silicone-based resin, solid fraction content: 55%), manufactured by Nissin Chemical Industry Co., Ltd.

Silicone 2: "KP-578" (a (meth)acrylic modified silicone-based resin, solid fraction content: 100%) manufactured by Shin-Etsu Chemical Co., Ltd.

Silicone 3: "SILFACE SAG008" (a polyether-modified silicone-based surfactant, active ingredient content: 95%) manufactured by Nissin Chemical Industry Co., Ltd.

<Evaluation>

(Applicability)

A heat-sensitive screen master ("RISO Digital Screen Master QS 120P-113-50", manufactured by RISO KAGAKU CORPORATION) was used as a screen printing plate without undergoing platemaking. On the surface of the screen printing mesh side of the screen printing plate, the treatment liquid of each of the Examples and Comparative Examples was applied with an applied area of 20 mm×100 mm and an applied amount of 50 g/m². Specifically, the treatment liquid was dropped onto the surface of the screen printing mesh side of the screen printing plate, and the dropped treatment liquid was spread on the surface of the screen printing plate using a squeegee. Thereafter, the applied treatment liquid was dried by blowing hot air with a dryer for one minute.

Thereafter, the portion of the screen printing plate to which the treatment liquid was applied was observed under a microscope, and when one opening surrounded by the fibers of the screen printing mesh was defined as one square, the number of squares in which the treatment liquid was applied out of 48 squares (6 squares×8 squares) of the openings was counted, and the application ratio (%) was determined according to the following formula. The obtained application ratio (%) was evaluated using the following evaluation criteria. The results are shown in Tables 1 to 3.

Application ratio (%)=(number of squares in which the treatment liquid is applied/48)×100

Evaluation Criteria
A: application ratio of 100%
B: application ratio of 95% or greater but less than 100%
C: application ratio of 90% or greater but less than 95%
D: application ratio of less than 90%

(Printing Durability)

A heat-sensitive screen master ("RISO Digital Screen Master QS 120P-113-50", manufactured by RISO KAGAKU CORPORATION) was used as a screen printing plate without undergoing platemaking. On the surface of the screen printing mesh side of the screen printing plate, the treatment liquid of each of the Examples and Comparative Examples was applied with an applied area of 300 mm×200 mm and an applied amount of 50 g/m². Specifically, the treatment liquid was dropped onto the surface of the screen printing mesh side of the screen printing plate, and the dropped treatment liquid was spread on the surface of the screen printing plate using a squeegee. Thereafter, the applied treatment liquid was dried by blowing hot air with a dryer for one minute.

Thereafter, the screen printing plate was framed on an aluminum frame having a dimension of 550 mm×600 mm with a tension of 11 N/cm. Next, this frame of the plate was set on an automatic screen printing machine ("LS-34GX", manufactured by Newlong Seimitsu Kogyo Co., Ltd.). As a printing medium, a cotton fabric (100% cotton, manufactured by EBIHARA) was set on the printing table. A plastisol ink ("MP 19000 BLACK" (black), manufactured by WILFLEX) was charged onto the plate. Under the printing conditions of a squeegee angle of 70°, a squeegee pressure of 0.30 MPa, a squeegee back pressure of 0.10 MPa, a clearance of 3 mm, the pressing quantity of squeegee of 0 mm, and the pressing quantity of scraper of 0 mm, continuous printing was performed.

Two thousand printed items were printed by the continuous printing, and the number of black dots (pinholes) of the ink generated in the 2000th obtained printed item was counted as the number of pinholes. The counted number of pinholes was evaluated using the following evaluation criteria. The results are shown in the tables.

Evaluation Criteria
AA: the number of pinholes is zero
A: the number of pinholes is one
B: the number of pinholes is from two to five
C: the number of pinholes is from six to nine
D: the number of pinholes is ten or greater

TABLE 1

| | (% by mass) | Ex. 1 | Ex. 2 | Ex. 3 | Ex. 4 | Ex. 5 | Ex. 6 | Ex. 7 |
|---|---|---|---|---|---|---|---|---|
| Resin | Urethane-based resin emulsion 1 (solid fraction content: 32%) | 62.5 | 62.5 | 62.5 | 62.5 | | | |
| | Urethane-based resin emulsion 2 (solid fraction content: 45%) | | | | | 44.4 | | |
| | (Meth)acrylic-based resin emulsion (solid fraction content: 40%) | | | | | | 50.0 | |
| | Vinyl chloride-based resin emulsion (solid fraction content: 24%) | | | | | | | 83.3 |
| Water | | 35.9 | 36.2 | 36.2 | 35.9 | 54.0 | 48.4 | 15.1 |
| Surfactant | Acetylene glycol-based surfactant 1 (active ingredient content: 100%) | 1.3 | | | 1.3 | 1.3 | 1.3 | 1.3 |
| | Acetylene glycol-based surfactant 2 (active ingredient content 100%) | 0.3 | 0.3 | 0.3 | | 0.3 | 0.3 | 0.3 |

TABLE 1-continued

| (% by mass) | | Ex. 1 | Ex. 2 | Ex. 3 | Ex. 4 | Ex. 5 | Ex. 6 | Ex. 7 |
|---|---|---|---|---|---|---|---|---|
| | Acetylene glycol-based surfactant 3 (active ingredient content 100%) | | | | | 0.3 | | |
| | Polyoxyethylene alkylether-based surfactant 1 (active ingredient content: 100%) | | 1.0 | | | | | |
| | Polyoxyethylene alkylether-based surfactant 2 (active ingredient content: 100%) | | | 1.0 | | | | |
| Silica | Colloidal silica (solid fraction content: 30%) | | | | | | | |
| Silicone-based compounds | Silicone 1 (solid fraction content: 55%) | | | | | | | |
| | Silicone 2 (solid fraction content: 100%) | | | | | | | |
| | Silicone 3 (active ingredient content: 95%) | | | | | | | |
| Total | (% by mass) | 100.0 | 100.0 | 100.0 | 100.0 | 100.0 | 100.0 | 100.0 |
| Evaluation | Applicability | A | B | B | A | A | A | A |
| | Printing durability | A | B | B | A | A | A | A |

TABLE 2

| (% by mass) | | Ex. 8 | Ex. 9 | Ex. 10 | Ex. 11 | Ex. 12 | Ex. 13 |
|---|---|---|---|---|---|---|---|
| Resin | Urethane-based resin emulsion 1 (solid fraction content: 32%) | 62.5 | 62.5 | | 62.5 | 62.5 | 62.5 |
| | Urethane-based resin emulsion 2 (solid fraction content: 45%) | | | 88.9 | | | |
| | (Meth)acrylic-based resin emulsion (solid fraction content: 40%) | | | | | | |
| | Vinyl chloride-based resin emulsion (solid fraction content: 24%) | | | | | | |
| Water | | 36.9 | 35.6 | 9.5 | 33.9 | 34.9 | 34.9 |
| Surfactant | Acetylene glycol-based surfactant 1 (active ingredient content: 100%) | | 1.3 | 1.3 | 1.3 | 1.3 | 1.3 |
| | Acetylene glycol-based surfactant 2 (active ingredient content 100%) | 0.3 | 0.3 | 0.3 | 0.3 | 0.3 | 0.3 |
| | Acetylene glycol-based surfactant 3 (active ingredient content 100%) | 0.3 | | | | | |
| | Polyoxyethylene alkylether-based surfactant 1 (active ingredient content: 100%) | | | | | | |
| | Polyoxyethylene alkylether-based surfactant 2 (active ingredient content: 100%) | | | | | | |
| Silica | Colloidal silica (solid fraction content: 30%) | | 0.3 | | | | |
| Silicone-based compounds | Silicone 1 (solid fraction content: 55%) | | | | 2.0 | | |
| | Silicone 2 (solid fraction content: 100%) | | | | | 1.0 | |
| | Silicone 3 (active ingredient content: 95%) | | | | | | 1.0 |
| Total | (% by mass) | 100.0 | 100.0 | 100.0 | 100.0 | 100.0 | 100.0 |
| Evaluation | Applicability | C | A | A | A | A | A |
| | Printing durability | C | AA | AA | AA | AA | AA |

TABLE 3

| Table 3 (% by mass) | | Comparative Example 1 | Comparative Example 2 | Comparative Example 3 |
|---|---|---|---|---|
| Resin | Urethane-based resin emulsion 1 (solid fraction content: 32%) | 62.5 | 62.5 | 62.5 |
| | Urethane-based resin emulsion 2 (solid fraction content: 45%) | | | |
| | (Meth)acrylic-based resin emulsion (solid fraction content: 40%) | | | |
| | Vinyl chloride-based resin emulsion (solid fraction content: 24%) | | | |
| | Water | 37.5 | 36.2 | 36.5 |
| Surfactant | Acetylene glycol-based surfactant 1 (active ingredient content: 100%) | | 1.3 | |
| | Acetylene glycol-based surfactant 2 (active ingredient content 100%) | | | |
| | Acetylene glycol-based surfactant 3 (active ingredient content: 100%) | | | |
| | Polyoxyethylene alkylether-based surfactant 1 (active ingredient content: 100%) | | | 1.0 |
| | Polyoxyethylene alkylether-based surfactant 2 (active ingredient content: 100%) | | | |
| Silica | Colloidal silica (solid fraction content: 30%) | | | |
| Silicone-based compounds | Silicone 1 (solid fraction content: 55%) | | | |
| | Silicone 2 (solid fraction content: 100%) | | | |
| | Silicone 3 (active ingredient content: 95%) | | | |
| Total (% by mass) | | 100.0 | 100.0 | 100.0 |
| Evaluation | Applicability | D | D | D |
| | Printing durability | D | D | D |

As shown in the table, Example 1 to 13 showed excellent results in both the evaluation of applicability and the evaluation of printing durability.

On the other hand, Comparative Example 1, which does not contain a surfactant, and Comparative Examples 2 and 3, which contain only one surfactant, showed inferior results in the applicability and the printing durability, compared with the Example.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A treatment liquid for a screen printing plate, the treatment liquid comprising a resin, water, a surfactant A, and a surfactant B having a solubility in water lower than a solubility of the surfactant A in water,
wherein the surfactant A and the surfactant B are each independently selected from the group consisting of acetylene glycol-based surfactants, polyoxyethylene alkyl ether-based surfactants, polyoxypropylene alkyl ether-based surfactants, polyoxyethylene alkyl phenyl ether-based surfactants, polyoxypropylene alkyl phenyl ether-based surfactants, polyoxyethylene fatty acid ester-based surfactants, polyoxypropylene fatty acid ester-based surfactants, sorbitan fatty acid ester-based surfactants, polyoxyethylene sorbitan fatty acid ester-based surfactants, polyoxyethylene sorbitol fatty acid ester-based surfactants, and glycerol fatty acid ester-based surfactants,
wherein the solubility of the surfactant A in water at 23° C. is 1 g/100 g or greater, and the solubility of the surfactant B in water at 23° C. is less than 1 g/100 g.

2. The treatment liquid for a screen printing plate according to claim 1, wherein the surfactant A is an acetylene glycol-based surfactant.

3. The treatment liquid for a screen printing plate according to claim 1, wherein a minimum film forming temperature of the resin is 23° C. or lower.

4. The treatment liquid for a screen printing plate according to claim 1, further comprising silica.

5. The treatment liquid for a screen printing plate according to claim 1, further comprising at least one selected from the group consisting of a polyether-modified silicone-based compound and a (meth)acrylic-modified silicone-based compound.

6. The treatment liquid for a screen printing plate according to claim 1, wherein the surfactant A and the surfactant B are each independently selected from the group consisting of acetylene glycol-based surfactants and polyoxyethylene alkyl ether-based surfactants.

7. The treatment liquid for a screen printing plate according to claim 5, wherein the at least one selected from the group consisting of a polyether-modified silicone-based compound and a (meth)acrylic-modified silicone-based compound comprises at least one selected from the group consisting of polyether-modified silicone-based surfactants and (meth)acrylic-modified silicone-based resins.

8. A method for treating a screen printing plate, the method comprising treating a screen printing plate with the treatment liquid for a screen printing plate according to claim 1.

9. The method for treating a screen printing plate according to claim 8, wherein the surfactant A is an acetylene glycol-based surfactant.

10. The method for treating a screen printing plate according to claim 8, wherein a minimum film forming temperature of the resin is 23° C. or lower.

11. The method for treating a screen printing plate according to claim 8, wherein the treatment liquid for a screen printing plate further comprises silica.

12. The method for treating a screen printing plate according to claim 8, wherein the treatment liquid for a screen printing plate further comprises at least one selected from the group consisting of a polyether-modified silicone-based compound and a (meth)acrylic-modified silicone-based compound.

13. The method for treating a screen printing plate according to claim 8, wherein the surfactant A and the surfactant B are each independently selected from the group consisting of acetylene glycol-based surfactants and polyoxyethylene alkyl ether-based surfactants.

14. The method for treating a screen printing plate according claim 12, wherein the at least one selected from the group consisting of a polyether-modified silicone-based compound and a (meth)acrylic-modified silicone-based compound comprises at least one selected from the group consisting of polyether-modified silicone-based surfactants and (meth)acrylic-modified silicone-based resins.

* * * * *